(12) United States Patent
Henty

(10) Patent No.: US 8,525,648 B1
(45) Date of Patent: Sep. 3, 2013

(54) BACKSCATTER PASSIVE WIRELESS CONTROLLER WITH IMD FREQUENCY CODING

(75) Inventor: David L. Henty, Newport Beach, CA (US)

(73) Assignee: Ezero Technologies LLC, Irvine, CA (US)

( * ) Notice: Subject to any disclaimer, the term of this patent is extended or adjusted under 35 U.S.C. 154(b) by 816 days.

(21) Appl. No.: 12/491,200

(22) Filed: Jun. 24, 2009

Related U.S. Application Data

(60) Provisional application No. 61/133,163, filed on Jun. 25, 2008.

(51) Int. Cl.
| | |
|---|---|
| *H04Q 5/22* | (2006.01) |
| *G08G 1/00* | (2006.01) |
| *G08B 13/14* | (2006.01) |
| *H01Q 1/24* | (2006.01) |
| *H01Q 1/50* | (2006.01) |
| *H03K 17/94* | (2006.01) |
| *G08C 19/12* | (2006.01) |
| *G06F 3/02* | (2006.01) |

(52) U.S. Cl.
USPC ...... 340/10.3; 340/10.41; 340/928; 340/10.2; 340/572.1; 343/702; 343/850; 341/20; 341/173; 345/168

(58) Field of Classification Search
USPC ............ 340/572.1, 572.5, 572.8, 825.56, 340/825.57, 825.69, 825.71, 10.1–10.6, 10.33, 340/10.3, 10.41, 928, 572.7; 341/20, 22, 341/26, 173, 176, 825.72, 825.69; 345/168, 345/171, 169, 172; 343/702, 850, 853
See application file for complete search history.

(56) References Cited

U.S. PATENT DOCUMENTS

| | | | | |
|---|---|---|---|---|
| 5,910,965 | A | * | 6/1999 | Ierfino et al. .................. 375/220 |
| 6,133,833 | A | * | 10/2000 | Sidlauskas et al. ......... 340/572.1 |
| 6,441,804 | B1 | * | 8/2002 | Hsien ............................. 345/158 |
| 6,828,902 | B2 | * | 12/2004 | Casden ........................ 340/10.3 |
| 2002/0093426 | A1 | * | 7/2002 | Jackson et al. ............. 340/572.7 |
| 2004/0145453 | A1 | * | 7/2004 | Tuttle ........................... 340/10.1 |
| 2007/0049845 | A1 | * | 3/2007 | Fleischman et al. .......... 600/561 |
| 2007/0103311 | A1 | * | 5/2007 | Kippelen et al. ............ 340/572.8 |
| 2009/0219137 | A1 | * | 9/2009 | Forster ......................... 340/10.1 |
| 2009/0284351 | A1 | * | 11/2009 | Rossman et al. ............. 340/10.1 |
| 2010/0214073 | A1 | * | 8/2010 | Kasai et al. .................. 340/10.2 |

* cited by examiner

*Primary Examiner* — Jennifer Mehmood
*Assistant Examiner* — Mirza Alam

(57) ABSTRACT

A backscatter passive wireless control system and method employs frequency coding using frequency components generated from an interrogating field using a passive nonlinear element such as a diode in a passive transponder tag. In particular, InterModulation Distortion (IMD) frequency components may be generated which are shifted in frequency from the interrogating signal to assist in backscatter detection at a receiver but are still in band, e.g., in an ISM band. The shifted frequency components may be swept or stepped over a range and passive elements in the tag encode a tag ID by selecting specific frequencies to be backscattered. A manually operated switch may couple an antenna to the transponder to allow battery free control.

18 Claims, 9 Drawing Sheets

BACKSCATTER PASSIVE WIRELESS CONTROLLER WITH IMD FREQUENCY CODING

RELATED APPLICATION INFORMATION

The present application claims the benefit under 35 USC 119(e) of provisional patent application Ser. No. 61/133,163 filed Jun. 25, 2008, the disclosure of which is incorporated herein by reference.

BACKGROUND OF THE INVENTION

1. Field of the Invention

The present invention relates to wireless controllers including wireless keyboards and remote controls. The present invention further relates to short range wireless transmission methods.

2. Background Information

Wireless controllers of various types including wireless keyboards and remote controls are ubiquitous. A disadvantage of such devices is the need for batteries. Batteries are inconvenient to the user. When batteries fail in a wireless device the system is useless until the batteries are replaced. This is obviously a significant inconvenience when the battery failure is not expected. Also, batteries are disposal problems since batteries typically contain heavy metals which are toxic and can represent an environmental hazard if disposed incorrectly.

Therefore, it is highly desirable to find an alternative to batteries for short range wireless transmission applications.

SUMMARY OF THE INVENTION

In a first aspect the present invention provides a wireless control system, comprising a source of an interrogating field having plural frequency components, an antenna adapted to wirelessly couple to the interrogating field, at least one manually activated switch, and a transponder. The transponder has one or more nonlinear elements, selectively coupled to the antenna by the switch, to reflect plural frequency shifted signals comprising one or more intermodulation signals derived from mixing the interrogating field plural frequency components by the one or more nonlinear elements. The wireless control system further comprises a receiver configured to receive and detect the reflected frequency shifted signals.

In a preferred embodiment of the wireless control system at least one of the plural frequency components of the interrogating field is swept or stepped across a frequency range to generate the plural frequency shifted signals. The plural frequency shifted signals may comprise a third order intermodulation signal which is swept or stepped across the frequency range. The nonlinear element may comprise a diode. The transponder preferably further comprises a plurality of frequency selective elements which select a subset of the plural frequency shifted signals and activating the switch selectively couples the plurality of frequency selective elements to the antenna. The wireless control system may further comprise a plurality of switches coupled to the transponder, wherein the switches selectively couple different frequency selective elements to the antenna to provide different frequency combinations in a coded reflected response. The source of an interrogating field having plural frequency components may comprise a fixed frequency RF source and a frequency hopping spread spectrum source. The source of an interrogating field may comprise a single antenna or plural antennas. The source of an interrogating field may further comprise a modulator for modulating at least one the plural frequency components of the interrogating field and the receiver may further comprise a demodulator for demodulating the received reflected frequency shifted signals. The wireless control system may further comprise a filter coupled to the transponder for filtering out intermodulation signals having a frequency outside a regulated frequency band.

In another aspect the present invention provides a passive transponder interrogation system. The passive transponder interrogation system comprises a source of an interrogating field having two or more discrete frequency components at least one of which is swept or stepped over a frequency range, a passive transponder comprising an antenna adapted to wirelessly couple to and reflect the interrogating field, one or more nonlinear elements to generate one or more frequency shifted signals which are swept or stepped over a frequency range to provide a range of frequencies and which comprise one or more intermodulation signals derived from mixing the interrogating field discrete frequency components, and a plurality of frequency selective elements selecting plural discrete frequencies from the range of frequency shifted signals which are reflected by the antenna, and a receiver configured to receive and detect the selected reflected frequency shifted signals.

In a preferred embodiment of the passive transponder interrogation system the one or more nonlinear elements may comprise a diode. The source of an interrogating field may comprise one or more transmit antennas, a modulator and an RF signal source coupling a swept or stepped RF signal and a fixed RF signal to the one or more transmit antennas, wherein at least one of the RF signals is modulated by the modulator.

In another aspect the present invention provides a method for identifying a passive transponder tag. The method comprises providing first and second wirelessly transmitted RF frequency interrogating signals to a passive transponder tag including an antenna, generating one or more intermodulation signal components which are frequency shifted from the interrogating signals by mixing the interrogating signals at the tag using a passive nonlinear circuit element, sweeping or stepping the one or more intermodulation signal components across a frequency range by sweeping or stepping the frequency of one or more of the interrogating signals provided to the tag, selectively reflecting plural frequencies of the swept or stepped intermodulation signal components using passive frequency selective circuit elements at the tag, and receiving and detecting the reflected plural frequencies to identify a code corresponding to the tag.

In a preferred embodiment of the method for identifying a passive transponder tag the interrogating signals may be provided within a defined frequency band and the reflected signals are within the same frequency band. For example, the defined frequency band may be an ISM band. The method may further comprise modulating at least one of the first and second interrogating signals and demodulating the received reflected plural frequencies based on the same modulation scheme.

In another aspect the present invention provides a wireless control method. The control method comprises providing one or more wirelessly transmitted RF frequency interrogating signals to a passive transponder tag, selectively coupling a passive circuit in the tag to an antenna in response to activating a switch, generating a signal frequency shifted from the interrogating signal by using a passive nonlinear circuit element at the tag, sweeping or stepping the shifted signal across a frequency range by sweeping or stepping the frequency of the one or more interrogating signals provided to the tag, selectively wirelessly reflecting plural frequencies of the swept or stepped intermodulation signal components using passive frequency selective circuit elements at the tag and the antenna in response to the switch activation, and receiving and detecting the reflected plural frequencies to identify a control code in response to activation of the switch.

Further features and advantages of the invention will be appreciated by the following detailed description of the invention.

DETAILED DESCRIPTION OF THE INVENTION

The present application hereby incorporates by reference the disclosures of U.S. Pat. No. 5,838,138, U.S. Pat. No. 6,094,156, U.S. patent application Ser. No. 09/978,615 filed Oct. 16, 2001 (U.S. Pat. No. 7,006,014), U.S. patent application Ser. No. 10/003,778 filed Oct. 31, 2001, U.S. patent application Ser. No. 10/027,369 filed Dec. 20, 2001, U.S. patent application Ser. No. 11/363,388 filed Feb. 27, 2006 (U.S. Pat. No. 7,525,453), and U.S. Pat. No. 7,535,424.

Figure 1A:
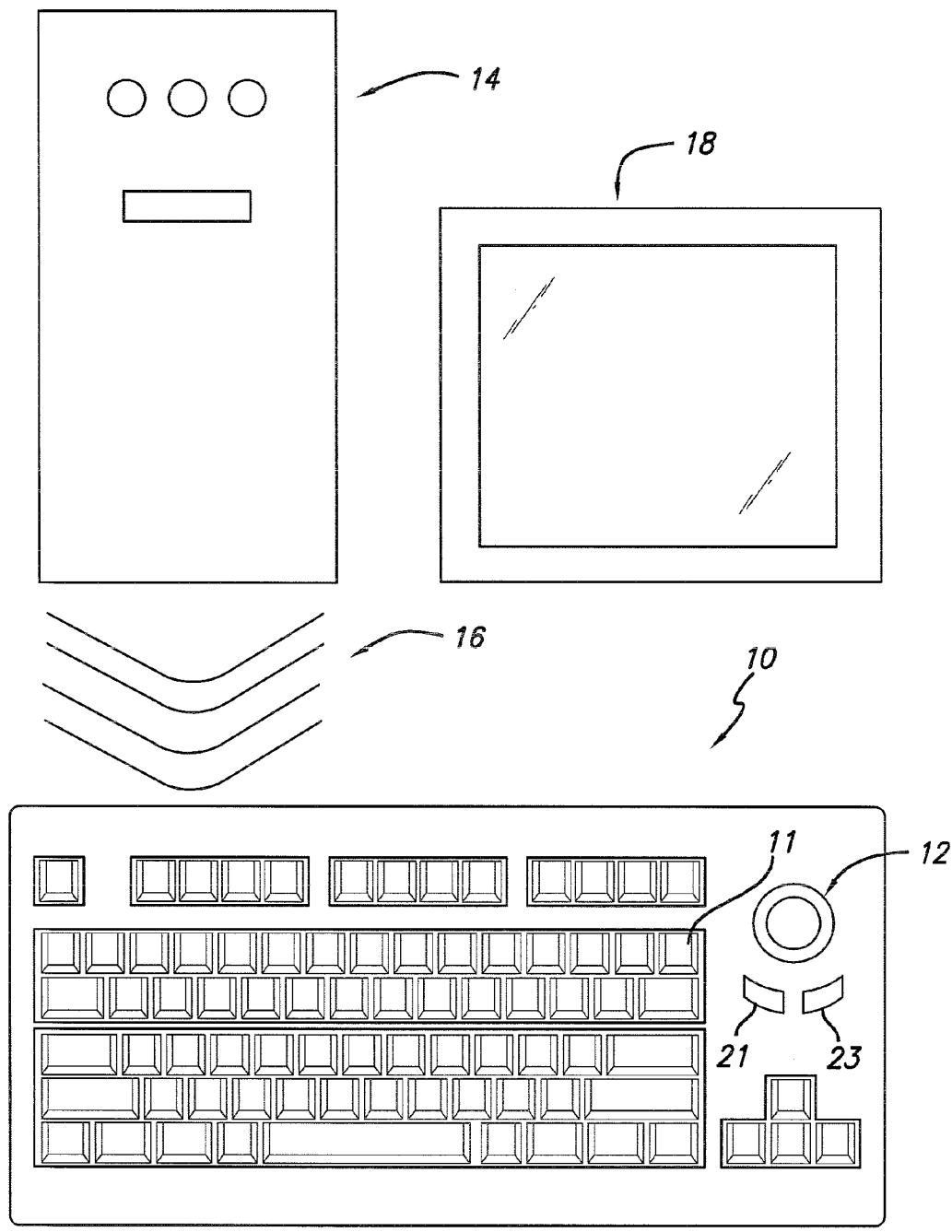
FIGS. 1A and 1B illustrate two embodiments of the invention, a computer system incorporating a passive wireless keyboard and a wireless controller, respectively.
Figure 1B:
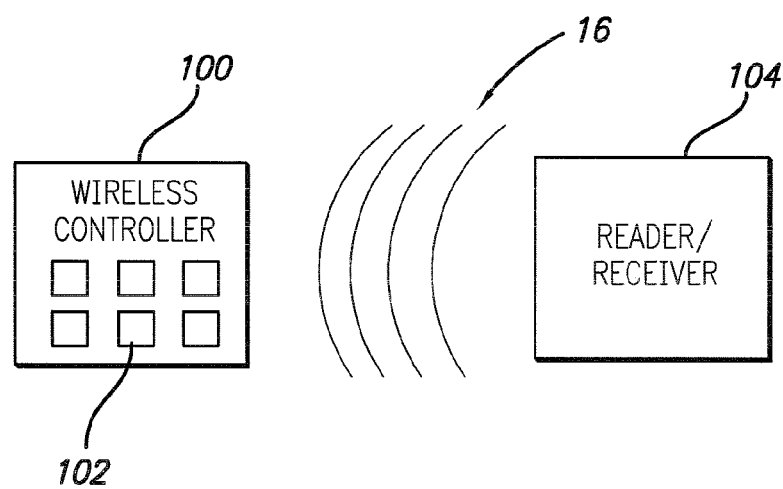

The present invention provides a backscatter transmission system and method adapted for short range low data rate applications, such as wireless keyboards and controllers, which operates without batteries. Accordingly the present invention also provides an improved wireless keyboard and an improved wireless controller. Referring to FIGS. 1A and 1B two embodiments of the invention, a computer system incorporating a passive wireless keyboard 10 and a wireless controller 100, respectively, are illustrated. Keyboard 10 may be a QWERTY keyboard, for example. The computer system as illustrated also includes a housing 14 which includes the processor, hard disk drive, and other components in a conventional computer system, as well as a reader unit which is the source of an interrogating field 16 which is used to interrogate the passive keyboard 10 and receive wireless transmission from wireless mouse 12. The interrogating field 16 has plural frequency components preferably within an unlicensed (relatively) unrestricted frequency band such as an ISM band and the reader receiver receives backscattered IMD components also within such frequency band as described below. For US applications such frequency bands are defined in Part 15 of the FCC licensing regulations, the disclosure of which is incorporated herein by reference. Other countries have similar (relatively) unrestricted frequency bands set out in various regulations. The wireless mouse may employ passive or active wireless transmission as described below. Although shown integrated into the keyboard housing as a trackball the mouse may be separate. Also a wired mouse or completely separate mouse transmission system may be provided. The computer system also includes a monitor 18 which may be a CRT or LCD type of display or other display known in the computer art. Interrogating field 16 is an RF modulated field generated by the reader and applied to a suitable antenna, contained within housing 14. Optionally the reader and/or the antenna may be contained within monitor 18. Alternatively, the reader may be incorporated in an add-on unit which interfaces with the computer housing 14 through an available port, such as a USB port, or the keyboard input.

Also, simpler controllers may employ the manually activated tag and reader as described with the manually activated input wirelessly initiating a control function with a coded response. Such a controller is generally illustrated in FIG. 1B. The controller 100 may have a single manual input 102 such as a key or switch or plural manual inputs. Reader 104 operates as described above and includes a suitable antenna and reader electronics. Examples of such a controller include remote controls, wireless game controllers, wireless control devices for home or office such as a light switch, home automation control, or wireless sensor for door or window for home or office security systems. In the latter case the manual input activation may be provided by releasing the manual input, held under tension when the door or window is closed with a spring or other bias means, rather than pressing the manual input as in the prior examples. Other examples of such a controller application include keyless entry systems for homes or automobiles. A variety of other applications are also possible. For simplicity of reference herein the term keyboard will be used for all such embodiments of controller 100.

Each key in keyboard 10 or 100 selectively couples a passive transponder circuit to backscatter the interrogating field 16 when a key is activated and provides a coded response to the reader which indicates the key activated. For example, the activation of a key in the keyboard 10 may close a switch that connects the transponder circuit corresponding to that key to its antenna thereby allowing it to couple to the interrogating field 16 and provide a coded response to the reader in the computer housing 14 or may couple/decouple the antenna by tuning/detuning the circuit. Each transponder corresponding to a given key in the keyboard 10 has a unique code identifying the key which is read by the reader and thus provides an identification of the specific key activation to the computer processor.

Figure 2:
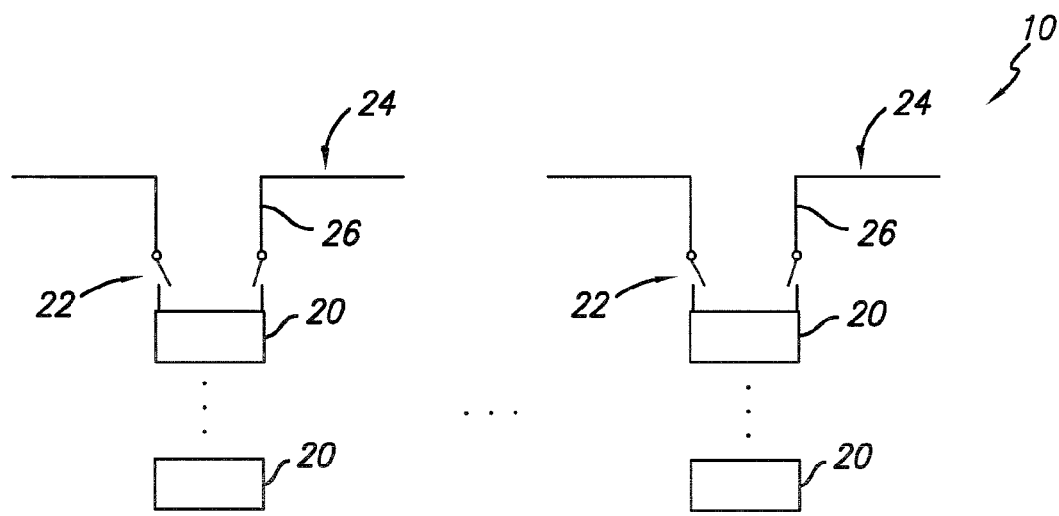
FIG. 2 is a schematic drawing of a portion of a keyboard of the embodiment of FIG. 1A or 1B showing an array of passive transponder ID circuits.

Referring to FIG. 2 a portion of keyboard 10 or 100 is illustrated showing a portion of an array of passive transponder ID circuits 20. Each circuit 20 may comprise a chip or a discrete circuit on the keyboard substrate. Each circuit includes frequency selecting circuitry such as a resonant circuit or filter to select a unique frequency code for the specific key of the keyboard 10 or 100 to which the tag 20 corresponds which is backscattered to the reader. A passive nonlinear element, such as a diode, is also coupled to each circuit. This creates InterModulation Distortion (IMD) components from the incident multi-frequency interrogating signal. These are shifted from the incident frequency components based on the order of the IMD and the sum and differences of the incident frequency components as known to those skilled in the art. In particular odd order components will be relatively close to the interrogating components and are within the desired unrestricted frequency band but may be discriminated from the interrogating signal at the receiver. These odd order IMDs are used to detect the key activation. Out of band components are preferably filtered out at the antenna 24 or are selected to be of sufficiently low intensity to avoid FCC limits of out of band emissions. Also as shown each tag 20 is coupled via a switch 22 to an antenna 24. When a key is activated by the keyboard user the depression of the key closes switch 22 thereby coupling the individual ID circuit 20 to the antenna 24. This allows the tag to couple to the interrogating field and reflect the field with a coded response to provide its unique code to the reader. Each tag 20 may have its own antenna. As antenna size can limit read range, however, it is generally desirable to have as large an antenna reflective signature as possible associated with each tag. This may be achieved by providing a common antenna to which is coupled a plurality of individual tags 20. This allows an antenna 24 to be dimensioned larger than in typical passive RFID applications up to substantially the entire size of the keyboard which can provide substantial increases in coupling to the interrogating field and corresponding increases in the read distance and read speed and integrity. Although the antenna 24 is illustrated as a simple dipole antenna 24 it will be appreciated that other antenna types are possible, including a multi-wire folded dipole. Also, the antenna 24 may be formed on a separate layer of the keyboard from the tags 20 with a connection 26 provided between the antenna layer and the layer on which the tags 20 are formed allowing the use of a patch antenna 24 or an antenna comprising an array of patches or microstrip lines. Whether the antenna 24 is on the same substrate as the tags 20 or a separate substrate the antennas may advantageously be formed using printed circuit board techniques to ease assembly and reduce costs.

Still referring to FIG. 2, in one embodiment of tag antenna 24 separate antennas 24 may be provided for different groups of keys. The number of separate antennas provided may be chosen to reduce or eliminate the possibility of simultaneously activated keys sharing an antenna during normal keyboard usage. This may reduce interference in the read operation between such simultaneously activated keys. For example, for a typical computer keyboard with CTRL, ALT and SHIFT keys adapted for use together with other keys, these may each be coupled to a separate antenna 24. A separate antenna 24 could then couple to the remaining keys, including all the text keys. Additional or fewer antennas may be provided for specific keyboard functionality. Alternatively, the antenna/key grouping may be chosen for optimal coupling and/or optimal layout of a printed circuit with the antennas and tag connections on the keyboard. For example, the keys may be coupled in columns to antennas arranged in rows along the top (as schematically illustrated) and bottom of the keyboard. Preferably, as noted above, the antennas in total exploit a substantial portion of the keyboard area to maximize read range.

Figure 3:
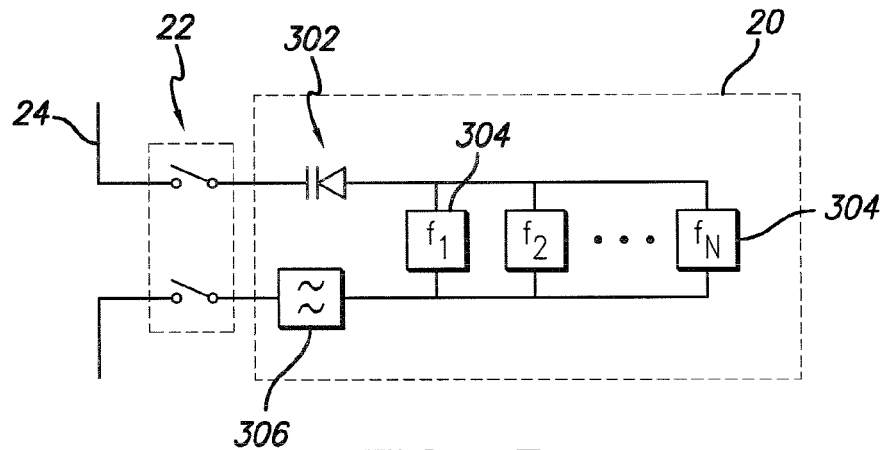
FIG. 3 is a schematic drawing of one example of a single transponder circuit coupled to an antenna in accordance with the invention.

Referring to FIG. 3 one example of a single circuit 20 coupled to an antenna 24 is shown. The circuit 20 is entirely passive enabling battery free operation. Since the circuit has no active components such as modulators the circuit does not need to obtain power from the interrogating field increasing range of operation. The circuit includes passive nonlinear element 302 shown as a capacitive diode in the illustrated embodiment. The circuit also includes N frequency selective elements 304, tuned for N distinct frequencies. This configuration allows an N bit code to be encoded in the N discrete frequencies. Such frequency selective elements 302 may include discrete components such as LC resonant circuits, chip based bandpass filters such as SAW filters, or distributed filters, as examples. Although N elements 304 are shown, for frequencies encoded as a zero a circuit may simply be absent at that frequency. Circuit 20 also preferably includes a filter 306 to block frequencies appearing outside the desired frequency range of the FCC ISM band.

Although one circuit 20 is shown in FIG. 3 it may simply be duplicated for each switch 22 in a multi-switch embodiment, with different frequencies f1 . . . fN encoded in the elements 304. Alternatively, the circuitry 20 may be shared between switches. In particular if the specific implementation of frequency selection circuits 304 occupy significant surface area then combinations of circuits 304 may be connected by switches 22 to create a unique code for each key. For example a printed circuit layer with distributed filters or LC circuits may be employed for circuits 20 which filters are coupled in different groups to keys 11 in a top layer. Also the nonlinear element 302 and/or filter 306 may be shared between different switches.

Figure 4A:
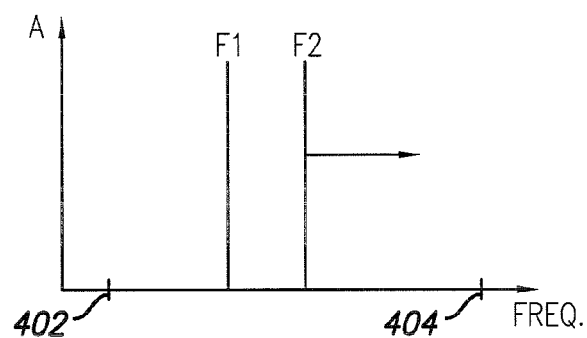
FIGS. 4A-4D illustrate schematically the IMD frequency encoding for an interrogating signal with two frequency components in accordance with the invention.

Referring to FIGS. 4A-4D the IMD frequency encoding is illustrated schematically for an interrogating signal with two frequency components. In FIG. 4A the interrogating signal provided by the reader is shown having discrete frequencies F1 and F2. These are provided in a frequency band having less restrictive FCC (or other regulatory agency) regulations on emission power, such as an ISM band. The band frequency limits are denoted by lower and upper frequency boundaries 402, 404 respectively. (Note that frequency ranges are not to scale in the figures.) For example, the 915 MHz (26 MHz wide) band, 2.45 GHz (30 MHz wide) band, 5.8 GHz (30 MHz wide) band or 24.25 GHz (100 MHz wide) band may be employed. (Additional bandwidth may be available for frequency hopping or digitally modulated signals as defined in FCC part 15, incorporated herein by reference, and such techniques may be employed as discussed below.) More generally, internationally the following ISM bands are commonly defined: 902-928 MHz (center frequency 915 MHz); 2.400-2.500 GHz (center frequency 2.450 GHz); 5.725-5.875 GHz (center frequency 5.800 GHz); 24-24.25 GHz (center frequency 24.125 GHz) and may be the indicated band. F1 and F2 are chosen so that strong odd order IMD components will lie within the band and be sufficiently spaced from the F1 and F2 frequencies to allow discrimination of the IMDs from F1 and F2 at the receiver within the reader. As an example, if F1 were 2.450 GHz and F2 were 2.455 GHz a third order IMD would be generated at 2.460 GHz by a nonlinear circuit element. In interrogation mode the signals F1 and F2 will preferably be continuously generated and the spacing of the IMD frequency allows their detection without the much stronger interrogating signals overwhelming the receiver circuit. As indicated by the arrow in FIG. 4A, one or both of F1 and F2 are swept over a frequency range causing the IMD(s) to sweep over a corresponding range. Alternatively, the frequency of F1 and/or F2 may hop in discrete jumps between frequencies with the IMD(s) similarly hopping. This approach can take advantage of frequency hopping spread spectrum (FHSS) circuits in the reader, which have been widely developed in volume for low cost applications and can similarly reduce reader costs. Also one or both of F1 and F2 are modulated so that modulation will also appear in the IMD(s) allowing the IMDs to be distinguished from noise.

Figure 4B:
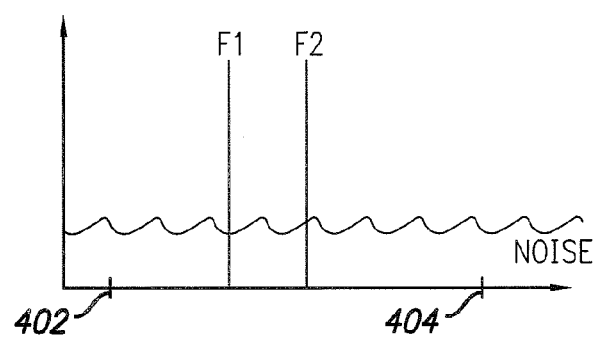
Figure 4C:
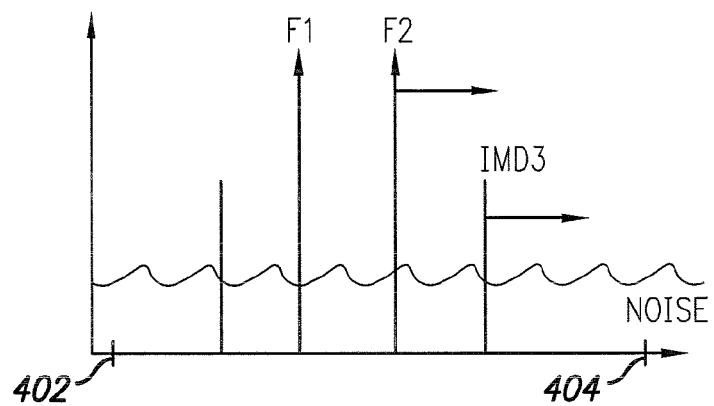
Figure 4D:
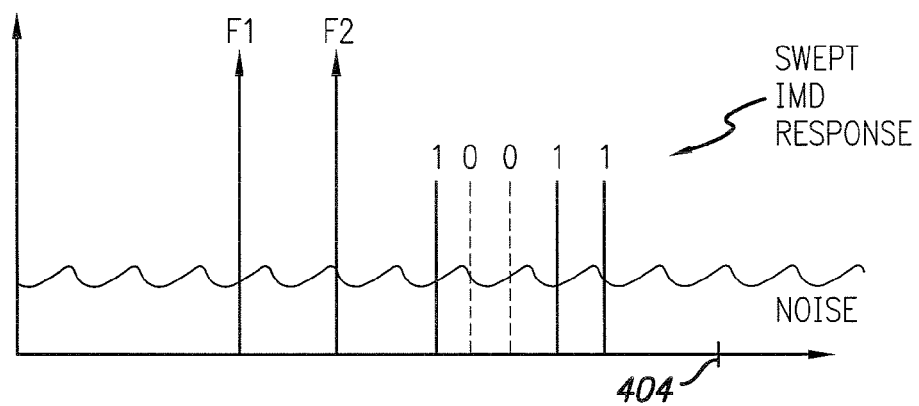

In FIG. 4B the signal at the receiver in the reader is shown when the switch 22 is disconnected. This shows a strong signal from F1 and F2 and background noise. In FIG. 4C the signal at the receiver is shown with the switch closed. As shown the IMD(s) now also appear at the receiver (third order IMD is illustrated) reflected from the antenna 24 as a backscatter signal. In FIG. 4D the frequency response of the backscattered IMD(s) at the different frequencies f1 . . . fN is shown as the F1/F2 signals are swept which also cause the IMD frequency to sweep. (Or move in discrete jumps as noted above.) The example shown is for a five bit (N=5) code encoded in circuits 304 (specific code example is 1,0,0,1,1; dashed lines indicate a missing backscattered IMD signal at f2, f3).

Figure 5A:
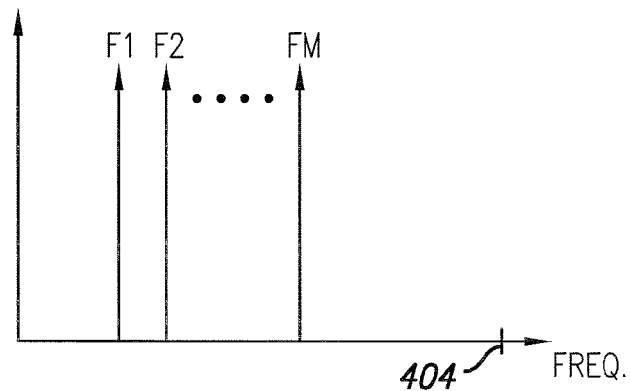
FIGS. 5A-5C illustrate schematically an alternate embodiment of the invention employing IMD frequency encoding for an interrogating signal with multiple frequency components.
Figure 5B:
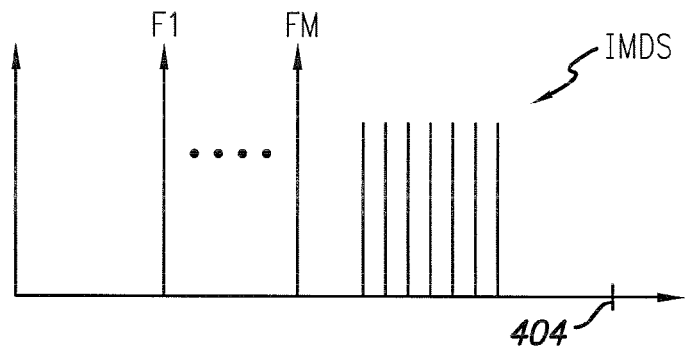
Figure 5C:
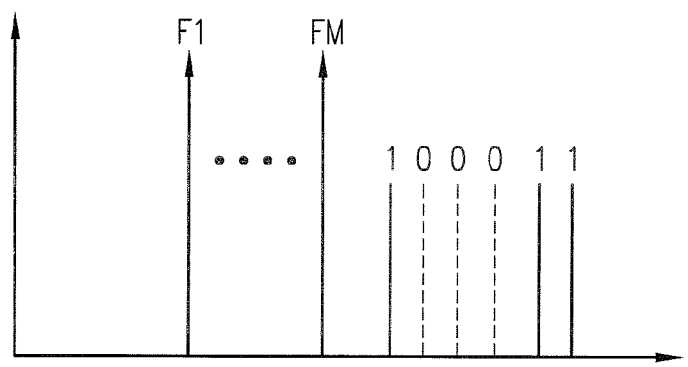

Referring to FIG. 5A-5C an alternate embodiment is illustrated schematically for an interrogating signal with multiple frequency components F1-FM. As before these components are spaced within an ISM band and have a relative spacing to allow generation of odd order IMDs within the same band. In this embodiment a number of discrete frequencies F1-FM allow creation of a relatively dense sequence of backscattered IMDs (FIG. 5B) when the switch 22 is closed. Therefore a swept frequency is not needed and the IMDs are generated simultaneously. The frequency encoded N bit signal encoded by circuits 304 and received at the receiver is illustrated in FIG. 5C (shown is a 6 bit example 1,0,0,0,1,1). The generation of a relatively large number of frequency components F1-FM may employ Direct Signal Spread Spectrum (DSSS) techniques for example to take advantage of existing low cost circuits designed for other DSSS applications.

Figure 6A:
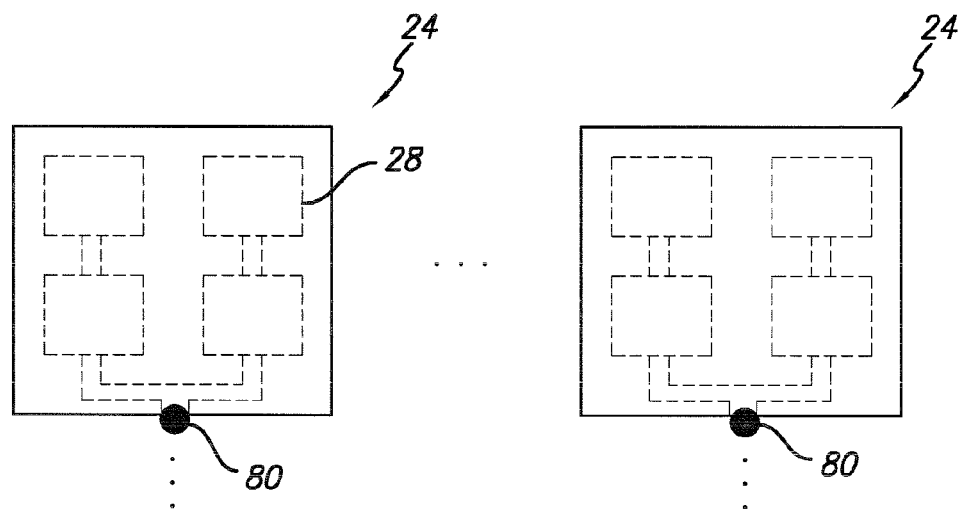
FIGS. 6A and 6B are top and side sectional views of a keyboard in accordance with the invention employing a multi-layer structure and a planar antenna design.
Figure 6B:
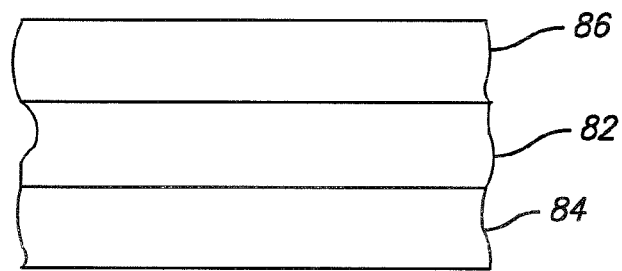

FIGS. 6A and 6B are top and side sectional views of a keyboard 10 or 100 employing a multi-layer structure and a planar antenna design. Referring first to FIG. 6A, a layer of keyboard 10 is illustrated employing a planar antenna pattern thereon. The generally planar backscatter antenna 24 may employ known patch antenna or multi-stripline designs which may be configured on the keyboard housing or part of the housing. For example, patch antenna designs are described in the RFID Handbook, second edition, Klaus Finkenzeller (Chapter 4) the disclosure of which is incorporated by reference. The planar pattern may be generally split across the keyboard into columns or rows of antennas 24 or antenna elements 28. Other configurations are also possible. The antenna configuration will be chosen for the specific implementation to maximize reflective coupling to the interrogating field from the reader. A second layer of keyboard 10 may comprise circuits 20 and switches 22 connected to the antenna by connection 26, as described in relation to FIG. 2 above. For example a printed circuit layer with distributed filters or LC circuits comprising circuits 304 may be employed. The layer 82 may be configured on top of the antenna layer 84 as illustrated in FIG. 6B and connection 26 (FIG. 2) may connect to antenna 24 through conductive vias 80. Circuits 20, switches 22 and connection 26 may be formed on a suitable substrate. The layer 86 with the keys thereon (shown in FIG. 1A) is configured on top of the circuit layer with the keys aligned with switches 22.

As noted above antenna 24 may be optimized for the transmission of the data back to the reader, for example, to transmit data via backscatter modulation. For example, if a 2.45 GHz interrogating field is used approximately a half wavelength antenna or antenna element dimension may be employed. In addition to a patch antenna, for example, antenna 24 may be a half wavelength dipole antenna array configured over a substantial portion of the keyboard to provide a strong reflected signal. Plural antennas 24 may also be provided each respectively coupled to one or more circuits as described above. Plural antennas 24 may also be provided each respectively having a different orientation to reduce sensitivity to keyboard orientation. Also, other antenna designs may be employed, e.g., a bowtie antenna, multi-element half wavelength dipole, or folded dipole antenna design may be employed.

Figure 7A:
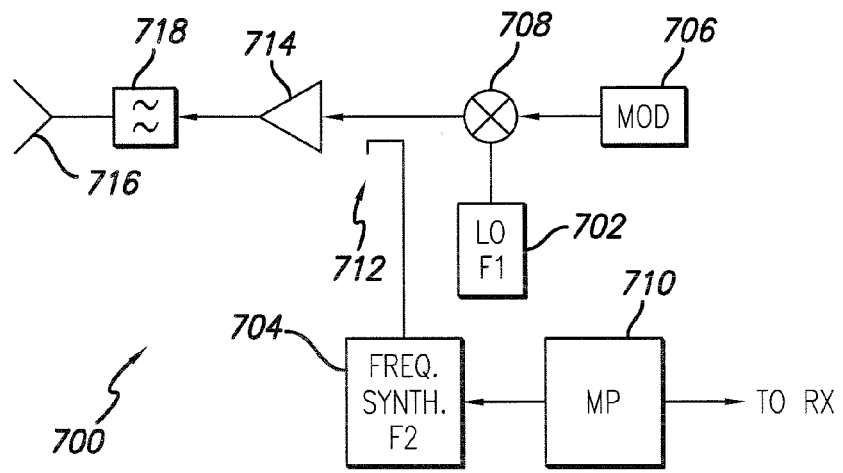
FIGS. 7A-7C are schematic drawings of the transmitter for providing the interrogating field in accordance with embodiments of the invention.
Figure 7B:
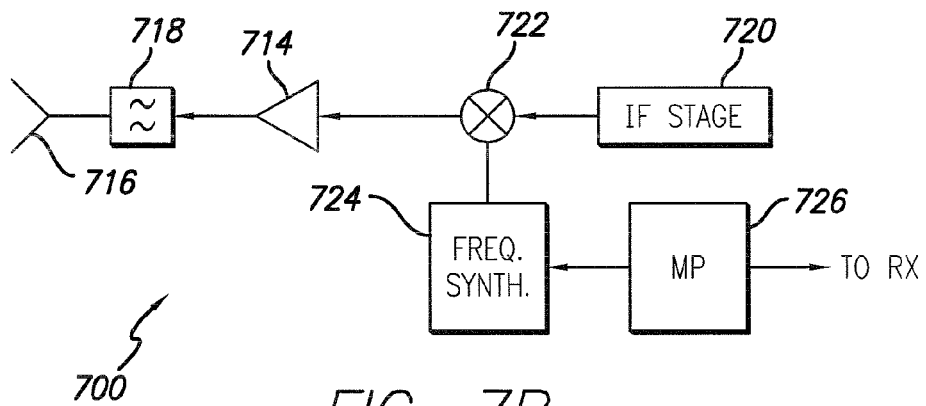
Figure 7C:
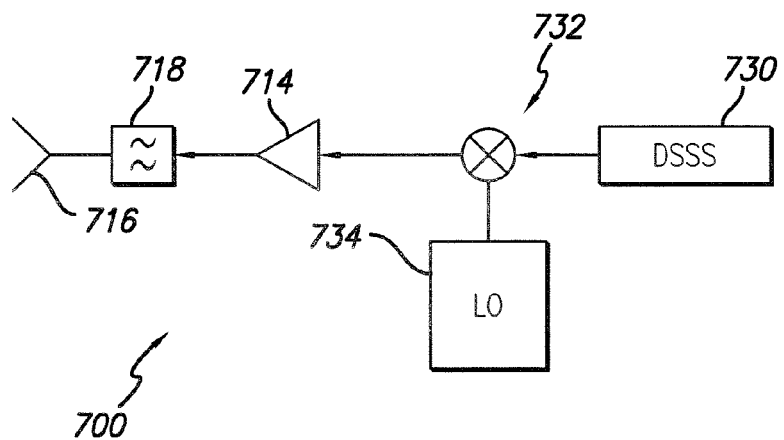

Referring to FIG. 7A-7C transmitter embodiments are shown for the reader providing interrogating field 16. As will be appreciated from the above, several different embodiments for creating plural frequencies F1, F2 etc. are possible. FIG. 7A illustrates an embodiment of a transmitter 700 with two separate RF frequency generators 702, 704 generating F1 and F2, respectively. A modulator 706 provides a modulated signal to mixer 708 which outputs modulated signal F1. It should be appreciate that the signal path may be an I, Q path with digital I, Q modulation provided by modulator 706 (in which case a D to A converter will be provided in the circuit). A second variable frequency synthesizer 704 receives a frequency control signal from frequency control circuit 710, which for example may be a microprocessor controller, which creates signal F2 which is swept continuously over a frequency range or hops or jumps in discrete frequency steps (again appropriate D to A circuitry will be employed). This RF signal F2 is coupled to the main signal path via coupler 712 which provides the two components to amplifier 714 and antenna 716. A filter 718 is provided before the antenna to filter out IMDs generated by nonlinearities within amplifier 714. As will be appreciated by those skilled in the art the illustrated circuits are highly schematic and various additional circuit components such as filters typically may be provided. In FIG. 7B an alternate embodiment of transmitter 700 is shown which creates two frequencies at an IF stage 720, for example by creating modulated sidebands, which are upconverted to RF at 722. This dual component F1, F2 RF signal is swept over a frequency range or hops or jumps in discrete frequency steps by control of variable frequency synthesizer 724 which receives a frequency control signal from frequency control circuit 726, which for example may be a microprocessor controller. This is provided to an amplifier and antenna as in the prior embodiment. In FIG. 7C an embodiment is illustrated which creates a large number of frequency components such as described in relation to FIG. 5. As one example a DSSS generator may be employed which generates an IF signal which is upconverted to RF using a fixed frequency oscillator signal 734. Other modulation techniques may also be used to create a number of components F1-FM.

Figure 8:
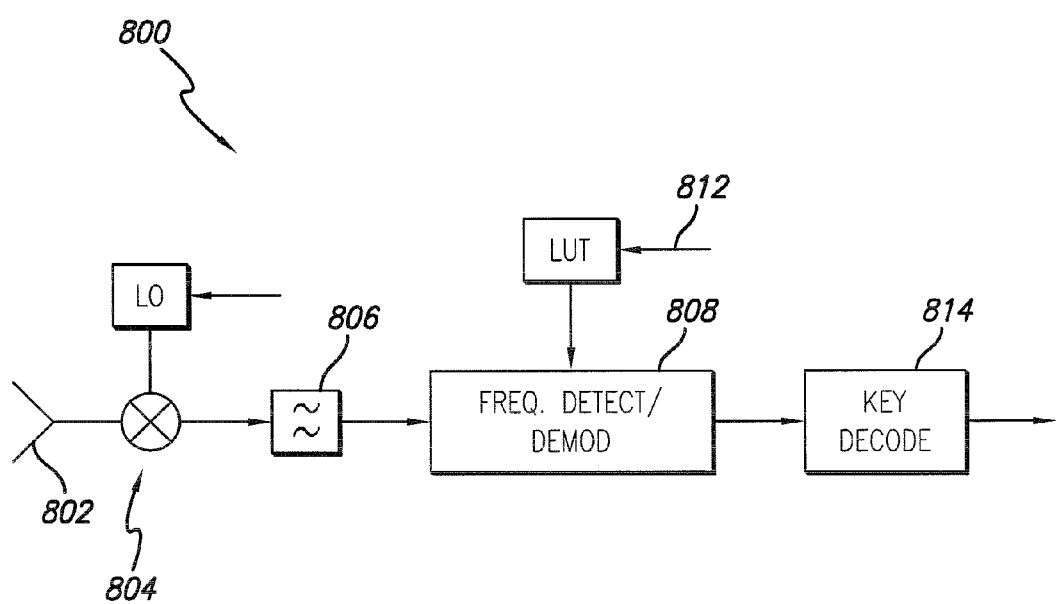
FIG. 8 is a schematic drawing of one example of a receiver in accordance with the invention.

Referring to FIG. 8 a receiver forming part of the reader is illustrated. An antenna 802 receives the backscattered RF signal from antenna 24. This antenna 802 may be shared with transmitter 700 if an isolator is employed or a separate antenna may be used. A down converter 804 provides an IF signal to a filter 806 which eliminates the F1 and F2 components and the IMD components are passed to a frequency component detector circuit 808 for detecting the frequency components f1 . . . fN. This may be a digital filter bank or a DSP which performs a frequency analysis of the signal and a demodulator. Alternatively, in some implementations a bank of N SAW bandpass filters could be employed with threshold detectors. Depending on digital or analog detection a ND converter will be provided before circuit 808. If a frequency hopping approach is used, or if the location of components f1 . . . fN is otherwise not fixed, a LUT 810 may be provided which receives a hopping control signal from the transmitter along line 812 and determines the location of the frequencies f1 . . . fN as the transmit signal hops and provides filter coefficients to the circuit 808. The output of the circuit 808 is a 0 or 1 for each of f1 to fN which is converted to a key code at circuit 814. The down converter 804 may also employ a controllable frequency synthesizer which receives a signal from the transmit circuit in the case of a swept frequency implementation.

Figure 9:
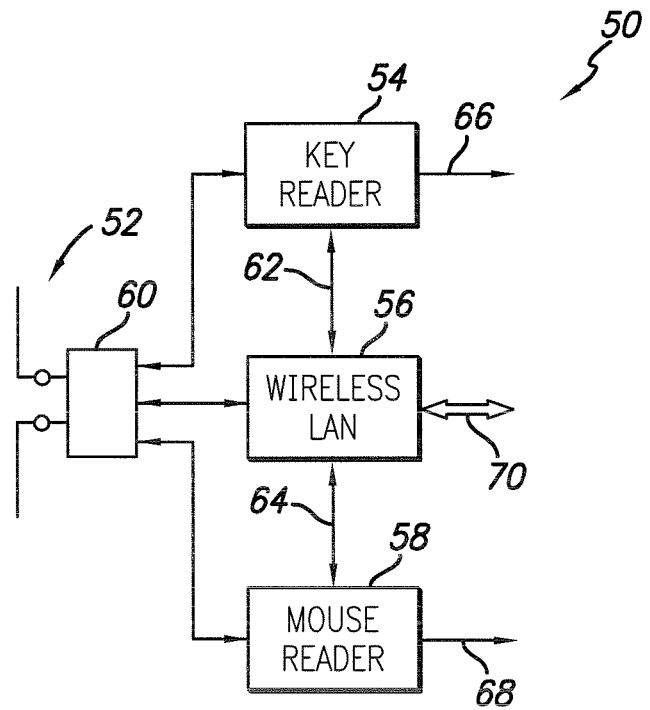
FIG. 9 is a schematic block diagram of a reader which shares circuitry with a wireless networking circuit.

Referring to FIG. 9 a reader block diagram is illustrated which shares circuitry with a wireless networking circuit. Such wireless networking circuits are well known, for example as defined in the WiFi specification, and as used herein also includes systems such as Bluetooth or shorter range transceiver circuits such as the Zigbee specification. As noted above the backscatter system of the invention preferably employs an ISM band and 2.45 GHz is a commonly used frequency for such networking systems and 2.45 GHz band is an ISM band. This combined circuit has advantages in space and cost for computer systems having such a wireless networking capability and for example the wireless network and key/mouse reader circuitry may be configured on a single circuit board. Also FHSS or DSSS circuitry employed in certain of such systems, may be shared to provide plural discrete frequencies. As shown the combined reader and wireless networking circuit 50 may also include a shared antenna 52 coupled to key reader circuit block 54, wireless network circuit block 56 and mouse reader circuit block 58 via selective coupler 60. If the same antenna is used for transmit and receive the coupler may include a directional coupler and a switch (the double arrow lines may comprise separate signal paths from the directional coupler and are illustrated in this manner for convenience of illustration). The switching circuitry receives timing control signals from either of the circuit blocks which timing is communicated between the blocks via lines 62, 64. If the respective circuit blocks operate at different frequencies the selective coupler may also include filters to block the signal components of the other circuit blocks. The outputs of the key and mouse reader are provided to the computer system processor along lines 66, 68 and the wireless network bidirectional communication is along line 70. Although a shared antenna provides space advantages and some cost savings additional functions may be shared between circuit blocks. For example, circuit block 56 may control all transmit signals with separate decode blocks used for receiving and decoding functions. Alternatively, separate transmit circuits may be provided but a common decode block employed in circuit block 56. Finally, all functions may be implemented in a common block 56.

It will be appreciated from the foregoing that the above described embodiments may be modified in some circumstances. For example, the two (or more) frequencies F1, F2 etc. may be provided from separate RF sources or separate antennas may be employed in place of the embodiment of FIG. 7. Also separate antennas may be provided on the keyboard to receive the separate frequencies F1, F2, etc. which separate signals are then coupled together by switches 22. In particular this may be employed if a modulating frequency is received at one antenna having a substantially different frequency than the backscatter frequency, and potentially such modulating frequency could lie in a different band than the ISM band of the backscatter signal. Also if only a single swept or hopped frequency F1 is employed, IMDs will not be generated but harmonics of F1 will be generated by the nonlinear circuit element (FIG. 3, element 302) and such harmonics will be frequency swept or hopped to allow frequency encoding of plural bits using a circuit such as in FIG. 3. Therefore, a frequency selective swept or hopped harmonic backscatter detection system is equally implied herein. However, in such an embodiment the out of band backscatter frequency may be subject to much more stringent regulatory requirements, such as FCC and/or European requirements, and so such embodiment may not be preferred for many applications. It will be appreciated from the foregoing that the above described embodiments of applications are purely illustrative examples and a variety of different implementations of both the system employing the keyboard, the reader and the keyboard itself are possible. Also, the passive transponder system may be employed in applications without coupling to a switch and many such applications are possible.

Variations in the specific implementations and layouts in turn are too numerous to describe in detail including a variety of different combinations of transmission schemes, antenna designs, modulation schemes, frequency ranges, etc.

What is claimed is:

1. A wireless control system, comprising:
a source of an interrogating field having plural frequency components;
an antenna adapted to wirelessly couple to the interrogating field;
at least one manually activated switch;
a transponder having one or more nonlinear elements, selectively coupled to the antenna by said switch, to reflect plural frequency shifted signals comprising one or more intermodulation signals derived from mixing the interrogating field plural frequency components by said one or more nonlinear elements; and
a receiver configured to receive and detect said reflected frequency shifted signals, wherein at least one of the plural frequency components of said interrogating field is swept or stepped across a frequency range to generate said plural frequency shifted signals and wherein said plural frequency shifted signals comprises a third order intermodulation signal which is swept or stepped across said frequency range; and
a receiver configured to receive and detect said reflected frequency shifted signals.

2. A wireless control system as set out in claim 1, wherein said nonlinear element is a diode.

3. A wireless control system as set out in claim 1, wherein said transponder further comprises a plurality of frequency selective elements which select a subset of said plural frequency shifted signals and wherein activating said switch selectively couples said plurality of frequency selective elements to the antenna.

4. A wireless control system as set out in claim 3, further comprising a plurality of switches coupled to said transponder, wherein said switches selectively couple different frequency selective elements to said antenna to provide different frequency combinations in a coded reflected response.

5. A wireless control system as set out in claim 1, wherein said source of an interrogating field having plural frequency components comprises a fixed frequency RF source and a frequency hopping spread spectrum source.

6. A wireless control system as set out in claim 1, wherein said source of an interrogating field comprises a single antenna.

7. A wireless control system as set out in claim 1, wherein said source of an interrogating field comprises plural antennas.

8. A wireless control system as set out in claim 1, wherein said source of an interrogating field further comprises a modulator for modulating at least one said plural frequency components of said interrogating field.

9. A wireless control system as set out in claim 8, wherein said receiver further comprises a demodulator for demodulating said received reflected frequency shifted signals.

10. A wireless control system as set out in claim 1, further comprising a filter coupled to said transponder for filtering out intermodulation signals having a frequency outside a regulated frequency band.

11. A passive transponder interrogation system, comprising:
- a source of an interrogating field having two or more discrete frequency components at least one of which is swept or stepped over a frequency range, wherein said source of an interrogating field having plural frequency components comprises a fixed frequency RF source and a frequency hopping spread spectrum source;
- a passive transponder comprising an antenna adapted to wirelessly couple to and reflect the interrogating field, one or more nonlinear elements to generate one or more frequency shifted signals which are swept or stepped over a frequency range to provide a range of frequencies and which comprise one or more intermodulation signals derived from mixing said interrogating field discrete frequency components, and a plurality of frequency selective elements selecting plural discrete frequencies from said range of frequency shifted signals which are reflected by said antenna; and
- a receiver configured to receive and detect said selected reflected frequency shifted signals.

12. A passive transponder interrogation system as set out in claim 11, wherein said one or more nonlinear elements comprise a diode.

13. A passive transponder interrogation system as set out in claim 11, wherein said source of an interrogating field comprises one or more transmit antennas, a modulator and an RF signal source coupling a swept or stepped RF signal and a fixed RF signal to said one or more transmit antennas, wherein at least one of said RF signals is modulated by said modulator.

14. A method for identifying a passive transponder tag, comprising:
- providing first and second wirelessly transmitted RF frequency interrogating signals to a passive transponder tag including an antenna;
- generating one or more intermodulation signal components which are frequency shifted from said interrogating signals by mixing the interrogating signals at the tag using a passive nonlinear circuit element;
- sweeping or stepping the one or more intermodulation signal components across a frequency range by sweeping or stepping the frequency of one or more of the interrogating signals provided to the tag, wherein said intermodulation signal components comprise a third order intermodulation signal which is swept or stepped across said frequency range;
- selectively reflecting plural frequencies of the swept or stepped intermodulation signal components using passive frequency selective circuit elements at the tag; and
- receiving and detecting the reflected plural frequencies to identify a code corresponding to the tag.

15. A method for identifying a passive transponder tag as set out in claim 14, wherein said interrogating signals are provided within a defined frequency band and wherein said reflected signals are within the same frequency band.

16. A method for identifying a passive transponder tag as set out in claim 15, wherein said defined frequency band is an ISM band.

17. A method for identifying a passive transponder tag as set out in claim 14, further comprising modulating at least one of said first and second interrogating signals and demodulating the received reflected plural frequencies based on the same modulation scheme.

18. A wireless control method, comprising:
- providing one or more wirelessly transmitted RF frequency interrogating signals to a passive transponder tag;
- selectively coupling a passive circuit in the tag to an antenna in response to activating a switch;
- generating a signal frequency shifted from said interrogating signal by using a passive nonlinear circuit element at the tag;
- sweeping or stepping the shifted signal across a frequency range by sweeping or stepping the frequency of said one or more interrogating signals provided to the tag;
- selectively wirelessly reflecting plural frequencies of the swept or stepped intermodulation signal components using passive frequency selective circuit elements at the tag and the antenna in response to said switch activation, wherein said intermodulation signal components comprise a third order intermodulation signal which is swept or stepped across said frequency range; and
- receiving and detecting the reflected plural frequencies to identify a control code in response to activation of said switch.

* * * * *